Aug. 13, 1929.  J. EATON  1,724,830
SYSTEM OF MOTOR CONTROL
Filed Oct. 19, 1926
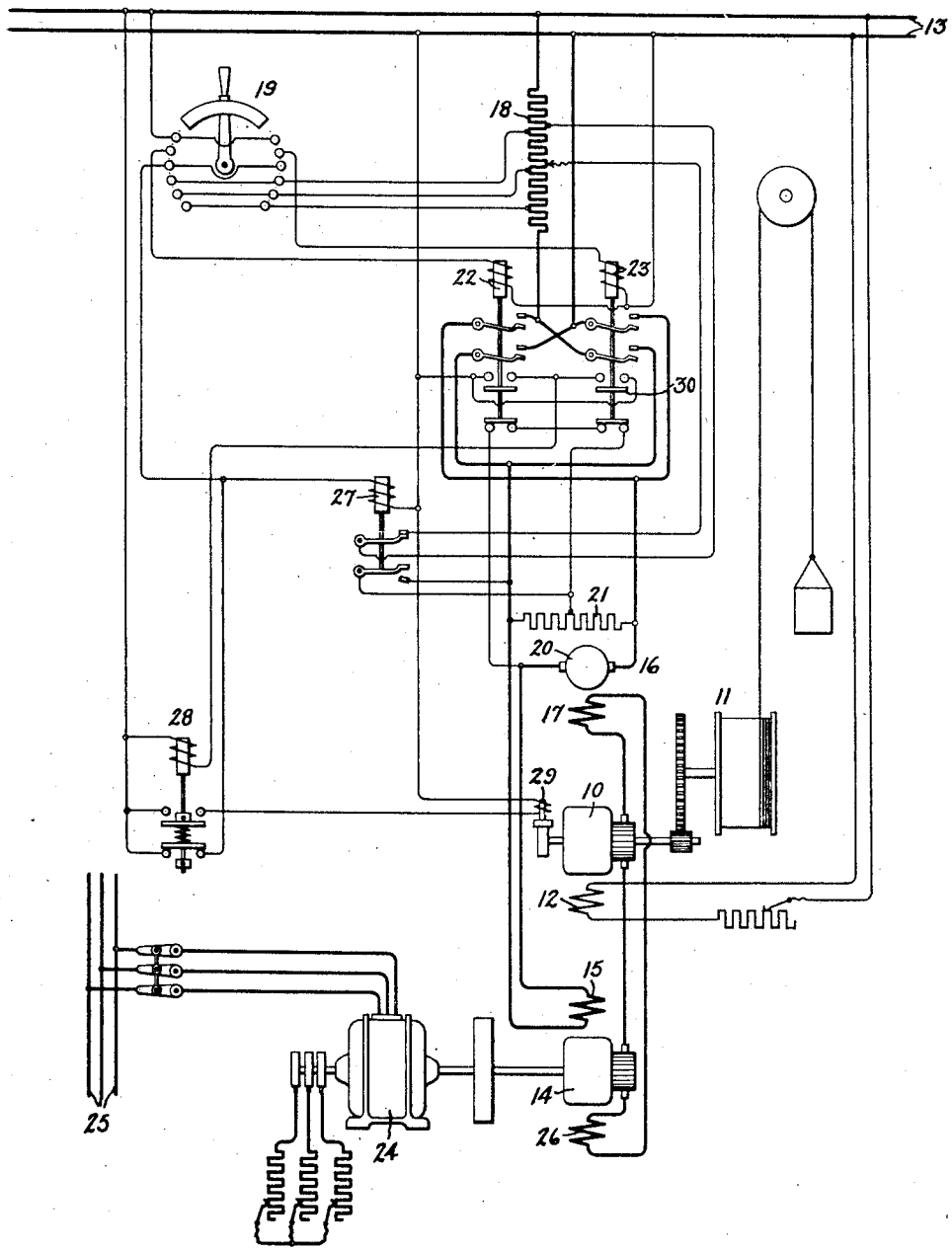
Inventor:
John Eaton,
by *Alexander S. [Smith]*
His Attorney.

Patented Aug. 13, 1929.

1,724,830

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

SYSTEM OF MOTOR CONTROL.

Application filed October 19, 1926. Serial No. 142,731.

My invention relates to improvements in systems of motor control, and in particular to improvements in the system for which Max A. Whiting filed an application on April 3, 1924, Serial No. 704,059, control of dynamo electric machines.

The Whiting application, which is assigned to the same assignee as the present invention, discloses and broadly claims a system in which a component of the excitation of the separately excited field winding of the generator of a Leonard drive is automatically regulated by a series exciter, a controller including resistance arranged to be varied thereby being provided whereby the speed of the separately excited motor supplied with armature current by said generator may be varied at the will of an operator. The Whiting system is such that an automatic regulating effect is had which inherently compensates for the variables which occur, for example in a hoisting or elevator installation, whereby desirable motor speed torque curves for the various positions of the controller are secured.

While the system as disclosed in the said Whiting application is entirely operative and practical, it leaves something to be desired in that during acceleration, the current taken by the motor may be greater than desirable and thus commutation difficulties are likely to arise. By cutting down the effectiveness of the series exciter this condition is helped but that interferes with the regulating effect of the series exciter in properly compensating for other conditions for which the full effectiveness of the series exciter is desired.

One of the objects of my invention is to reduce the peak currents which occur during acceleration.

A further object is to effect this reduction without causing an increase in the separately excited generator field current to be handled by the controller so as to obviate the difficulties which arise in controlling heavy currents in an inductive circuit.

A still further object is to prevent any tendency of the load driven by the motor of the Leonard system from dropping back when the controller is thrown from an off or neutral position to a slow speed position.

In carrying my invention into effect I provide a series field for the generator of the Leonard drive and connect this field so as to be differential with respect to the separately excited generator field for positive loads of the associated motor. In accordance with the system of the said Whiting application, a resistor arranged to be varied by a manually operable controller is connected in series relation with a parallel circuit formed by a resistor shunting a circuit which includes the separately excited generator field winding and the armature of the series exciter in series relation. In accordance with my invention, I provide an automatic control for the said resistors whereby overexcitation of the generator separately excited field winding is temporarily secured when the controller is thrown from its off or neutral position to a low motor speed position. The effect of residual magnetism in the generator field structure is thus neutralized and the operation of the motor stabilized so that when the motor is used to drive an elevator, for example, there is no tendency of the elevator car dropping slightly before the car is hoisted.

For a better understanding of the invention, reference is had to the accompanying drawing which shows in simplified diagram a system of motor control for an electric elevator in accordance with the invention.

Referring to the drawing, the electric motor 10 is connected to drive the sheave 11 of an electric elevator, hoist or the like. This motor is provided with a separately excited field winding 12 which receives energy from the source of supply 13. The armature of motor 10 is included in a local circuit with the armature of the separately excited generator 14. The generator and motor thus form a Leonard drive. The field winding 15 of the generator is arranged to be separately excited from the source of supply 13 and the series exciter 16 is provided for regulating a component of the separate excitation of this field winding 15. The field winding 17 of the series exciter is included in the local circuit which includes the armatures of the motor 10 and generator 14. A resistor 18, arranged to be varied by the manually operable controller 19, is included in series relation with a parallel circuit, one branch of which includes the separately excited generator field 15 and the armature 20 of the series exciter, and the resistor 21 forms the other branch of this circuit. The controller 19 is operative to vary the resistor 18 step by step and is also operative through the reversing contactors 22 and 23 to effect reversal of the operation of the motor 10.

The generator 14 is arranged to be driven in any suitable manner and I have indicated this generator as being driven by the three phase alternating current motor 24 which receives its power supply from the three phase source 25. The system thus far described is the system disclosed and claimed in the said Whiting application, Serial No. 704,059, filed April 3, 1924.

In order to neutralize the effect of residual magnetism in the field structure of the generator and to otherwise improve the operating charateristics of the motor 10 so that when the controller 19 is thrown from its off position as indicated to a low motor speed position, the elevator car will not drop back slightly before being hoisted, and to insure that the current in the local circuit, including the armatures of generator 14 and motor 10 will not be excessive so as to cause commutation difficulties, I have provided the generator series field winding 26 and the automatic means, including the contactors 27 and 28, for controlling the resistors 21 and 18.

The series winding 26 is wound so as to be differential with respect to the separately excited field winding 15 of the generator when the motor 10 is operating under positive load conditions. The contactor 27 is normally energized as indicated, so that the upper contacts of this contactor will shunt a regulatable portion of the resistor 18 and the lower contacts of this contactor are provided for shunting a portion of the resistor 21 when the contactor is automatically deenergized, as will be later explained. The contactor 28 is normally in its lower position, as shown, when the controller 19 is in its off position. The winding of this contactor is under the control of the directional contactors 22 and 23 and is arranged to be energized and the contactor picked up an interval after the closing of the directional contactor selected. The upper contacts of contactor 28 control the energization of the electromagnetic brake 29 which is provided for holding the elevator car while the motor 10 is deenergized. The lower contacts of this contactor are provided for controlling the energization of the contactor 27 when the controller 19 is in its second operative (low speed) position.

By means of the arrangement shown I am able to obtain a relatively high degree of energization of the separately excited field winding 15 when the controller 19 is moved from its off position to its second or low motor speed position. In general the sequence of operation is that after the controller 19 has been moved from its off position to its second position, the particular directional contactor, either 22 or 23, depending upon the direction in which the controller 19 is moved, is operated and by reason of the fact that a portion of the series resistor 18 is shunted by the upper contacts of contactor 27 and the entire resistor 21 is included in shunt with the circuit, including the generator field 15 and series exciter armature 20, a relatively high degree of energization of field winding 15 is temporarily secured. Because of the fact that the energization of the electromagnetic brake to release its braking effect is delayed for a slight interval through the operation of the contactor 28, the tendency of the elevator car to drop slightly before being hoisted is obviated. Furthermore, since the contactor 27 is deenergized a slight interval after the energization of the electromagnetic brake 29, the overexcitation of the generator field winding 15 is merely temporary, but nevertheless is present for a sufficient time to prevent any tendency of the elevator car dropping back before being hoisted. The deenergization of the contactor 27 effects the opening of the shunt about the portion of the resistor 18 and establishes a shunt about a portion of the resistor 21. This operates to effect automatically a reduction in the energization of the field winding 15 to a valve corresponding to the position of the controller 19.

As thus constructed and arranged and with the various parts in their respective positions as indicated in the drawing, the operation of my invention is as follows: Assume that the arrangement is such that clockwise rotation of the handle of the controller 19 is operative to effect a hoisting of the elevator cage and a counter-clockwise rotation of the handle of the controller 19 from its off position is operative to effect a lowering of the elevator cage. When the handle of the controller 19 is thrown clockwise from its off position indicated to its second operative position, the contactor 23 will be energized to close, thus connecting the field winding 15 to the source of supply 13 to effect the hoisting of the elevator cage. The field winding 15 will be momentarily overexcited because of the fact that a portion of the resistor 18 is temporarily shunted by the upper contacts of the contactor 27 and from the further fact that the entire resistor 21 is included in shunt relation with the circuit including the field winding 15 and exciter armature 20. This effect is merely temporary because of the fact that the winding of the contactor 28 will be energized through a circuit including the upper auxiliary switch 30 of contactor 23. When the contactor 28 picks up it will first energize the winding of the electromagnetic brake 29 so that this brake will release its braking effect on the shaft of motor 10 and permit the motor to begin hoisting the elevator cage. The lower contacts of contactor 28 will be opened a slight interval after the closing of the upper contacts of this contactor. This will effect the deenergization of the winding of contactor 27 so that the shunt about the portion of the resistor 18 established by the upper contacts of contactor 27 will be opened and the lower contacts of this contactor will shunt a portion of resistor 21. This will effect a reduction of the current in the field winding 15 to a value as determined by the position of the controller handle. It will thus be seen that the sequential operation of the closing of the directional contactor 23, the release of the electromagnet brake 29 and the deenergization of the contactor 27 is such that the generator field winding 15 is temporarily overexcited for a brief interval and thus the effect of residual magnetism in causing an uncertain operation of the motor 10 is neutralized.

The series differential field 26 of the generator 14 provides a stabilizing effect whereby the regulating effect of the series exciter 16 may be reduced without interfering with the functioning of the series exciter in automatically regulating the excitation of the generator field winding 15 so as to obtain desirable speed torque characteristic currents for the motor 10. The differential field 26 in neutralizing to a certain extent the flux set up by the field winding 15, prevents the occurrence of heavy rushes of current which would tend to cause commutation difficulties in the generator and motor armatures. The effect of this field is quite prompt since by regulating the effective excitation of the generator it regulates the current in the series field of the exciter 16 which in turn produces a prompt reduction in the regulating effect of the exciter in determining the excitation of the field winding 15.

In order to increase the speed of the driving motor 10 and thus of the driven elevator, the handle of the controller 19 will be moved clockwise through its successive positions, thereby shunting step by step the resistor 18.

It will be obvious that when the controller 19 is returned to its off position, the various parts of the system will assume their respective positions indicated in the drawing. A discharge path for the generator field winding 15 is provided by the lower auxiliary switches of the directional contactors 22 and 23.

In order to effect operation of the elevator in the opposite direction, the handle of the controller 19 is turned counter-clockwise and the operation of the system will be the same as before, except that in this case the directional contactor 22 will be energized to close and cause the direction of the current through the generator field winding 15 to be the reverse of that which was the case when the handle of the controller was thrown in the opposite direction. This will cause the motor 10 to rotate in a direction opposite to that which was previously the case and will cause a lowering of the elevator cage. It will be observed that in the third operative position of the controller (either direction of motor operation) that the winding of the contactor 27 is energized through the controller 19 so that the upper contacts of contactor 27 will shunt a portion of the series resistor 18 and the lower contacts of this contactor will open the shunt about the portion of the resistor 21. This will effect an increase in the current in the generator field winding 15 and thus effect an increase in the speed of the motor 10. In case the controller is thrown directly from its off position to this third position, the generator series differential field winding 26 will automatically operate to prevent an excessive current in the local circuit including the generator and motor armatures and thus obviate commutation difficulties.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. In combination, a generator having a separately excited field winding and a separately excited motor having its armature included in a local circuit with the armature of said generator, a series exciter connected to automatically regulate the energization of said field winding, a multiposition motor speed varying controller including resistance adapted to be varied thereby for varying the energization of said winding, a generator series field winding differentially wound with respect to said separately excited winding for stabilizing the operation of said motor, and means automatically operated an interval of time after the operation of said controller from an off position to a low speed position for decreasing the energization of said separately excited field winding.

2. In combination, a generator having a separately excited field winding and a separately excited motor having its armature in a local circuit with the armature of said generator, a series exciter connected to regulate a component of the separate excitation of said generator, a series field for said generator differentially wound with respect to said generator separately excited field winding, a multiposition controller for said separately excited generator field for determining the speed of said motor, the said controller including means for automatically effecting the neutralization of the effect of the residual magnetism of said generator in determining the resultant excitation of said generator at a low speed position of said controller.

3. In combination, a generator having a separately excited field winding and a motor having a separately excited field winding, the armatures of said motor and generator being included in a local circuit, an exciter excited in accordance with the current in said local circuit for regulating a component of the separate excitation of said generator, a controller for determining the direction and the value of the current in said generator field winding to determine the direction of operation and the speed of said motor, a series field winding for said generator differentially wound with respect to the said generator separately excited field winding, and means under the control of said controller for insuring a relatively high energization of said generator separately excited field winding when said motor is started, the said means being connected and arranged to automatically respond and reduce the energization of said generator separately excited field winding to the normal value determined by said controller after said motor has started.

4. In combination, in an electric elevator, hoist or the like, a generator having a separately excited field winding, a separately excited motor having its armature included in a local circuit with the armature of said generator, a series exciter for regulating a component of the separate excitation of said generator, a differential series field for said generator, a multiposition reversing and motor speed varying controller for said generator separately excited field winding, a parallel circuit comprising a resistor in shunt with the circuit including said exciter armature and said separately excited generator field winding, a second resistor included in series with said parallel circuit and arranged to be shunted step by step by said controller, an electromagnetic switch normally operative to shunt a portion of said series resistor and operative to another position at which the said shunt about the portion of said series resistor is opened and a shunt about a portion of said first resistor is established, a brake for said motor, an electromagnet for releasing the brake, and a switch controlled by said controller in a low motor speed position thereof for first energizing said brake electromagnet an interval after the initial energization of generator separately excited field and then effecting operation of said electromagnetic switch to said other position.

In witness whereof, I have hereunto set my hand this 16th day of October, 1926.

JOHN EATON.